3,205,060
SOIL CONDITIONING COMPOSITION
Albert W. Lindert, Homewood, Ill., assignor to Standard Oil Company, Chicago, Ill., a corporation of Indiana
No Drawing. Filed Mar. 26, 1962, Ser. No. 182,640
6 Claims. (Cl. 71—7)

This invention relates to the treatment of soils to make them suitable for the growing of nutritive agriculture crops, and particularly a capsule providing the treating agents.

Nutritive agricultural crops require the presence of fixed nitrogen in the soil in a form which is readily available to the plant; it is considered that nitrates contain the nitrogen in the desired form. Most soils contain organisms which are capable of converting atmospheric nitrogen or ammonia directly or through action on nitrates to the nitrate form; these organisms are broadly called nitrogen fixing organisms or nitrifying organisms. Usually there exist in the soil, organisms which convert fixed nitrogen to the free-nitrogen form. These organisms which, in effect, remove nitrogen from the soil are known as heterotrophic organisms or denitrifying organisms. The type of soil and climatic conditions determine the balance of these organisms. In a soil where the dentrifying organisms predominate, nutritive agriculture crops cannot be grown regardless of the seemingly favorable climatic conditions of rainfall and temperatures—the presence of lush tree, shrub and grass growth is not evidence of the ability to grow nutritive crops.

In tropical regions where moisture and sunlight are abundant, there is lush plant growth which results in the development of humus in the soil. The quality of the humus has a direct bearing on the bacterial organisms present in the soil. The mineral content of the soil has a profound effect on bacterial activity. A soil which is heavy with humus and poorly aerated has an unfavorable effect on the ability of nitrifying organisms to propagate. An acid soil with a pH below about 6 has an adverse effect on propagation of nitrifying bacteria.

Soils can be aerated by plowing and drainage. The soil pH can be raised by the use of lime and other alkaline agents. At this time a problem exists with respect to soil, which contains denitrifying organisms in amounts inhibiting the growth of nutritive agricultural crops, in how to reduce the number, or preferably to eliminate denitrifying organisms and how to introduce and to propagate nitrifying organisms.

This invention is directed to overcoming the problem of reducing the number of denitrifying organisms in the soil and simultaneously introducing nitrifying bacteria into that soil, thereby permitting the growth of nutritive agricultural crops. In one aspect of the invention a soil treating capsule is provided, which capsule includes an organic polymeric material shell, and a payload of nitrifying organism contained within said shell. This shell is characterized by appreciable solubility in water in order that water in the soil or rainfall will eventually release the payload into the soil. The shell is substantially free of pores in order to protect the payload from harmful materials owing to penetration of the shell. Another aspect of the invention is directed to a capusle as set out above, which capsule has positioned on its exterior a bactericide effective against denitrifying organisms. Thus, the soil immediately about the point of inoculation is freed, or at least is reduced in number, of denitrifying organisms (nitrifying and other organisms also will be reduced at that point in the soil) and an area will be created where the nitrifying organisms will be able to multiply when released from the capsule—the capsule shell is controlled to be dissolved by water at a rate such that the bactericide content in the soil is so lowered by water leaching that the released nitrifying organism is not adversely affected and can multiply. The effectiveness of the soil treatment is increased by having the bactericide form a part of a coat or outer shell enclosing the shell which in turn encloses the nitrifying organism payload.

The nitrifying (nitrogen fixing) organisms which form the payload may be any of those known to produce fixed nitrogen in the form suitable for use by nutritive agricultural crops. The particular nitrifying organism will be determined by the soil conditions, and climatic conditions where the soil treatment is to be carried out. Illustrative nitrifying bacteria are *Clostridium pasteurianum, Azotobacter chroococcum,* Nitrosomonas and Nitrobacter. Where legumes are to be grown, the payload may be *Bacillus radicicola.*

The payload preferably consists of the organism and a nutrient medium therefor. This medium preferably comprises carbohydrates such as mannite, dextrose, maltose, lactose, and starch. The medium may include a thickening agent to increase the viscosity and permit easier formation of the capsule shell about the droplet of payload. Any of the organic thickening agents which are not harmful to the organism may be used.

The payload is enclosed within a shell formed of an organic polymeric material. The shell must be harmless with respect to the enclosed organism. It must not permit the liquid, if any, present in the interior to pass through the shell and also must not permit the bactericide present in the soil to pass through the shell into the payload. This interdiction of passage in and out is obtained by having a shell which is characterized by a substantial freedom from porosity, i.e., is free of pores. (It has been observed that materials which exhibit porosity in very thin films can be used as shell formers in thicker films, i.e., porosity is related to the thickness of the film of material.)

The organic polymeric material must be capable of being formed into films suitable for formation of shells and the shell surface must be resistent to the formation of agglomerates of capsules.

A primary characteristic of the organic polymeric material is appreciable solubility in water. The payload is released from the capsule by dissolution of the shell by action of water which may be soil water or rainfall. In order to have the release in a reasonable period of time, the organic polymeric material must have appreciable water solubility. The degree of water solubility required by the shell will be determined by the particular operation. In a situation where the only need is the inoculation of the soil with nitrifying organisms, the shell may have not only high water solubility, but also may be made very thin so that almost immediate release of the payload will be obtained. In the more usual case, release of the payload must be delayed until (1) the denitrifying organisms have been reduced in number or eliminated by action of a bactericide and (2) the bactericide has been removed, say by water leaching, so that the nitrifying organisms when released will not be destroyed by the residual amounts of bactericide. In still another situation, the bactericide may be contained in an outer shell which releases the bactericide relatively slowly by action of soil water and provides a bactericidal action over a desired predetermined lengthy period of time; in this instance, the inner shell must protect the payload for the total time during which the bactericide is being released, and until the bactericide content of the soil has been lowered a safe level for the nitrifying organism payload. In other words, the solubility in water of the organic polymeric material is controlled by the type of material used and the thickness of the shell enclosing the payload so as to provide the desired time interval between the inoculation of the soil and the release of the nitrifying organism payload into the soil. It is self-evident that this will need to be determined for each particular soil climatic environment, and even the time available for carrying out the soil treatment; these times can be readily determined by experimentation carried out by those skilled in this art of soil husbandry in conjunction with those of ordinary skill in the organic polymeric art.

The polyvinyl alcohols are particularly suitable organic polymeric materials because a great variety of water solubilities are obtainable and films of a great variety of thicknesses can be easily produced therefrom. The cellulose ethers are also preferred organic polymeric materials for the purposes of the invention. These materials can be formed into films readily and afford a broad range of water solubility. Illustrative cellulose ethers are methyl cellulose, ethyl cellulose, sodium carboxymethyl cellulose, hydroxyethyl cellulose, and cyanoethyl cellulose.

It is to be understood that the soil may be treated first with a bactericide effective against denitrifying organisms—usually this bactericide will also be fatal to all other bacteria present in the soil—before the soil is inoculated with the capsule containing the nitrifying organism desired to be introduced into the soil. Obviously, this is a time consuming, double job manner of treating the soil. An important aspect of this invention permits treating the soil simultaneously with a bactericide and nitrifying organism by means of a capsule having such a bactericide positioned on the exterior of the capsule shell. Thus, the capsules may be dropped on to the surface of the soil from ground equipment, or rained down from an airplane. The capsules will be washed from foliage onto the ground when they are caught by leaves of trees or shrubbery. The bactericide may be positioned as such on the exterior surface of the capsule when it is possessed of adherency toward the shell and enough may be adhered to the shell to do the job in the soil. It is preferred to admix the bactericide with an organic material and coat the exterior of the capsule shell with this mixture. In some instances, it may be desirable to use an organic polymeric material suitable for forming the inner shell to form the outer shell—the bactericide having been dissolved or dispersed in the outer shell forming material prior to the formation of the outer shell. For example, the inner shell might be formed of hydroxyethyl cellulose and the outer shell formed of a polyvinyl alcohol having a substantially higher degree of water solubility than the material forming the inner shell, the relative difference in solubilities being determined by the total time desired between inoculation of the soil and release of the nitrifying organism.

Especially suitable bactericides are the compounds of mercury, copper and zinc. It is preferred to use organomercuric compounds and organo-copper compounds. These bactericides are well known. There is no need to introduce a long list of specific compounds.

The size of the capsules will be dependent upon the particular operation. In general, it is preferred that relatively small capsules permitting a more or less dusting quality to the soil treatment be used. Commonly the capsules will range in the size of 50–1,000 microns. Encapsulation procedures commonly produce a spectrum of sizes and materials much smaller than the 50 micron size will be present, and even some material above 1,000 microns will be present when these larger capsules are formed. It is to be understood that when a two-shell capsule is used, the diameters stated here will be determined by the thickness of the total two-shell capsule.

The capsules may be prepared by anyone of the procedures known to the art. It is to be understood that not all of the known procedures can be used with all shell-forming materials nor with all of the payload contents of the shell. An encapsulating method which is suitable for use with most materials is set out in U.S. Patent No. 2,766,478, granted October 16, 1956, to Raley, Burkett and Swearingen. In this patent the capsule is formed by having a droplet of the payload material fall against a disk of shell-forming material and having the shell material enclose the payload; the shell-forming material is hardened in a suitable bath or by a warm air stream. More sophisticated centrifugal apparatus for preparing capsules are set out in U.S. Patent No. 3,015,128, granted January 2, 1962, to G. R. Somerville, Jr. Capsules having a payload on the order of 50–90 percent can be readily prepared continuously by the use of a single nozzle machine as described in U.S. Patent No. 3,015,128.

In one embodiment of the invention suitable for use in the treatment of soil in sub-equatorial Africa where there is considerable rainfall, the nitrifying bacteria are *Clostridium pasteurianum* and *Bacillus radicicola*. The organism is contained in a nutrient medium of water and mannite—the nutrient medium is thickened with agar-agar. The shell material is a polyvinyl alcohol providing an estimated release time of about two weeks at a payload of about 70% by volume, and a capsule size in the range of 100–500 microns. The phenyl mercuric acetate bactericide is formed in a water solution thickened with sodium alginate. This sodium alginate coat permits almost immediate release of the bactericide into the soil being softened by ground water and washed from the inner shell by the next rain. The coat of sodium alginate provides about a thickness of 10 microns. The capsules are prepared utilizing a continuous apparatus as described in the Sommerville patent; the wet capsules being discharged into a stream of air at about 125° F. to harden the polyvinyl alcohol shell. The polyvinyl alcohol capsules are intermingled with the sodium alginate gel and immediately separated and passed into a warm air stream where the alginate coat is dried to form the outer shell containing the bactericide. The polyvinyl alcohol shell seals the nitrifying organism payload from the bactericide during the formation of the outer coat.

These capsules can be readily dispersed over the soil area being treated by means of a low flying airplane, the soil treatment being carried out approximately one month before it is desired to plant a nutritive agricultural crop, such as leguminous crops, e.g., peas and beans.

Thus having described the invention, what is claimed is:

1. A soil conditioning composition consisting essentially of a shell of organic polymeric material selected from the class consisting of polyvinyl alcohols, cellulose ethers, and mixtures thereof characterized by appreciable solubility in water and substantial freedom from porosity, a payload of a nitrifying organism selected from the class consisting of *Clostridium pasteurianum, Azotobacter chroococcum,* Nitrosomonas, Nitrobacter, and mixtures thereof encapsulated within said shell and an orangometal compound of a metal selected from the class consisting of mercury, copper, and zinc as a bactericide effective against denitrifying ogranisms positioned on the exterior of said shell.

2. The composition of claim 1 wherein said mercury compound is phenyl mercuric acetate.

3. The composition of claim 1 wherein said bactericide is contained within a coat positioned on said shell, which coat is characterized by substantial solubility in water.

4. The composition of claim 3 wherein said coat is an alkali metal alginate.

5. The composition of claim 3 wherein said shell is a polyvinyl alcohol having a significantly lower solubility in water than said coat.

6. A soil conditioning capsule adapted for reducing the number of denitrifying organisms in a soil and for the subsequent introduction of nitrifying organisms into said soil, which capsule consists essentially of a first shell formed from an organic polymeric material selected from the class consisting of polyvinyl alcohols, cellulose ethers, and mixtures thereof characterized by appreciable solubility in water and substantial freedom from porosity, a pay load within said first shell consisting essentially of a nitrifying organism selected from the class consisting of *Clostridium pasteurianum, Azotobacter chroococcum,* Nitrosomonas, Nitrobacter, and mixtures thereof and a nutrient medium therefor, and a second shell enclosing said first shell, which second shell is formed from organic material selected from the class consisting of alkali metal alginate, polyvinyl alcohols, cellulose ethers, and mixtures thereof characterized by a substantially higher degree of water solubility than said first shell and contains phenyl mercuric acetate as a bactericide effective against denitrifying organisms, whereby, when said capsule is deposited on a soil, said second shell is dissolved by water and said bactericide released to kill denitrifying organisms present in said soil, and then said first shell is dissolved at a rate such that the payload of nitrifying organisms is not released until said bactericide has been leached from the soil to an extent that the nitrifying organisms can multiply in said treated soil.

References Cited by the Examiner

UNITED STATES PATENTS

| | | | |
|---|---|---|---|
| 2,083,065 | 6/37 | Heyl | 47—58 |
| 2,091,993 | 9/37 | Jones | 71—1 |
| 2,313,057 | 3/43 | Fischer. | |
| 2,689,173 | 9/54 | Clarke | 71—1 |
| 2,703,276 | 3/55 | Hendrick et al. | 71—1 |
| 2,799,973 | 7/57 | Smith | 71—64 |
| 2,806,773 | 9/57 | Pole | 71—64 |
| 2,875,120 | 2/59 | Tradesman et al. | 71—1 |
| 2,954,643 | 10/60 | Porter | 71—6 |
| 2,982,394 | 5/61 | Novak | 71—1 |
| 3,009,804 | 11/61 | Goring | 71—1 |
| 3,069,370 | 12/62 | Jensen et al. | 71—64 |
| 3,115,404 | 12/63 | Carney. | |

FOREIGN PATENTS 854,918  11/60  Great Britain.

DONALL H. SYLVESTER, *Primary Examiner.*

ANTHONY SCIAMANNA, *Examiner.*